(12) United States Patent
Strong et al.

(10) Patent No.: US 9,189,360 B2
(45) Date of Patent: Nov. 17, 2015

(54) PROCESSOR THAT RECORDS TRACING DATA IN NON CONTIGUOUS SYSTEM MEMORY SLICES

(71) Applicants: Beeman C. Strong, Portland, OR (US); Jason W. Brandt, Austin, TX (US); Tsvika Kurts, Haifa (IL); Peter Lachner, Heroldstatt (DE); Itamar Kazachinsky, Netanya (IL); Stephen J. Robinson, Austin, TX (US); Peggy J. Irelan, Chandler, AZ (US)

(72) Inventors: Beeman C. Strong, Portland, OR (US); Jason W. Brandt, Austin, TX (US); Tsvika Kurts, Haifa (IL); Peter Lachner, Heroldstatt (DE); Itamar Kazachinsky, Netanya (IL); Stephen J. Robinson, Austin, TX (US); Peggy J. Irelan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 13/918,940

(22) Filed: Jun. 15, 2013

(65) Prior Publication Data
US 2014/0372987 A1 Dec. 18, 2014

(51) Int. Cl.
| | |
|---|---|
| *G06F 12/00* | (2006.01) |
| *G06F 11/34* | (2006.01) |
| *G06F 11/36* | (2006.01) |
| *G06F 11/32* | (2006.01) |
| *G06F 12/02* | (2006.01) |
| *G06F 12/06* | (2006.01) |

(52) U.S. Cl.
CPC ............. *G06F 11/34* (2013.01); *G06F 11/323* (2013.01); *G06F 11/3466* (2013.01); *G06F 11/3636* (2013.01); *G06F 11/3664* (2013.01); *G06F 11/3668* (2013.01); *G06F 12/023* (2013.01); *G06F 12/06* (2013.01)

(58) Field of Classification Search
CPC ... G06F 12/023; G06F 12/06; G06F 11/3636; G06F 11/3664; G06F 11/3668; G06F 11/323; G06F 11/3466
See application file for complete search history.

(56) References Cited

U.S. PATENT DOCUMENTS

| | | | | |
|---|---|---|---|---|
| 5,887,167 A | * | 3/1999 | Sutton ........................... | 719/314 |
| 7,035,989 B1 | * | 4/2006 | Hinker et al. ................. | 711/171 |

* cited by examiner

*Primary Examiner* — Shawn X Gu
(74) *Attorney, Agent, or Firm* — Nicholson de Vos; Webster & Elliot, LLP

(57) ABSTRACT

A method is described that involves referring to first information from a directory table in system memory. The first information includes location information and size information of a first slice of system memory where first tracing data is to be stored. The method also includes tracking the amount of tracing data stored in the first slice of system memory and comparing the amount against the size information. The method also includes, before the first slice of system memory is filled, referring to second information from the directory table in system memory, where, the second information includes location information and size information of a second slice of system memory where second tracing data is to be stored. The first slice is not contiguous with the second slice of system memory.

20 Claims, 13 Drawing Sheets

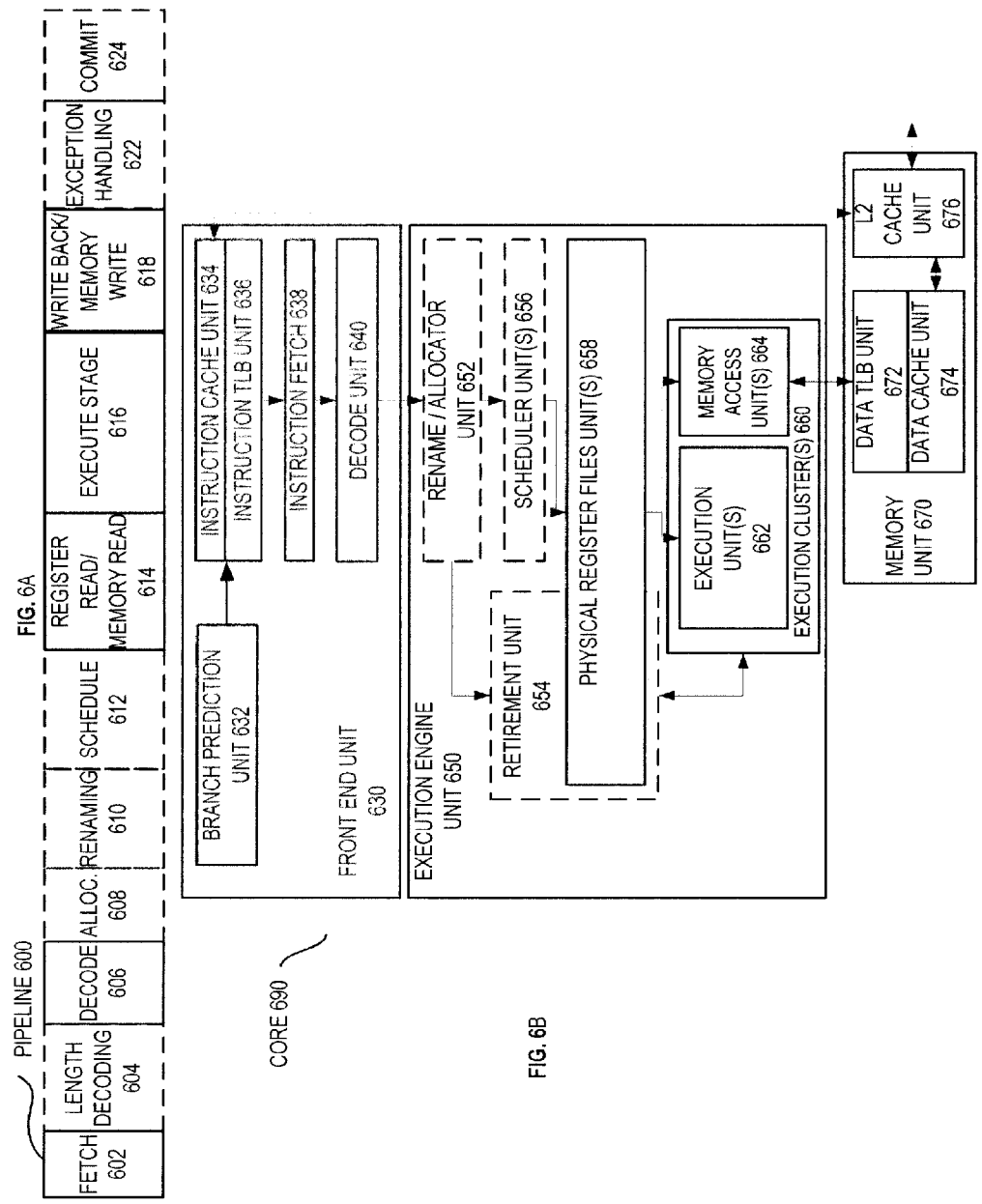

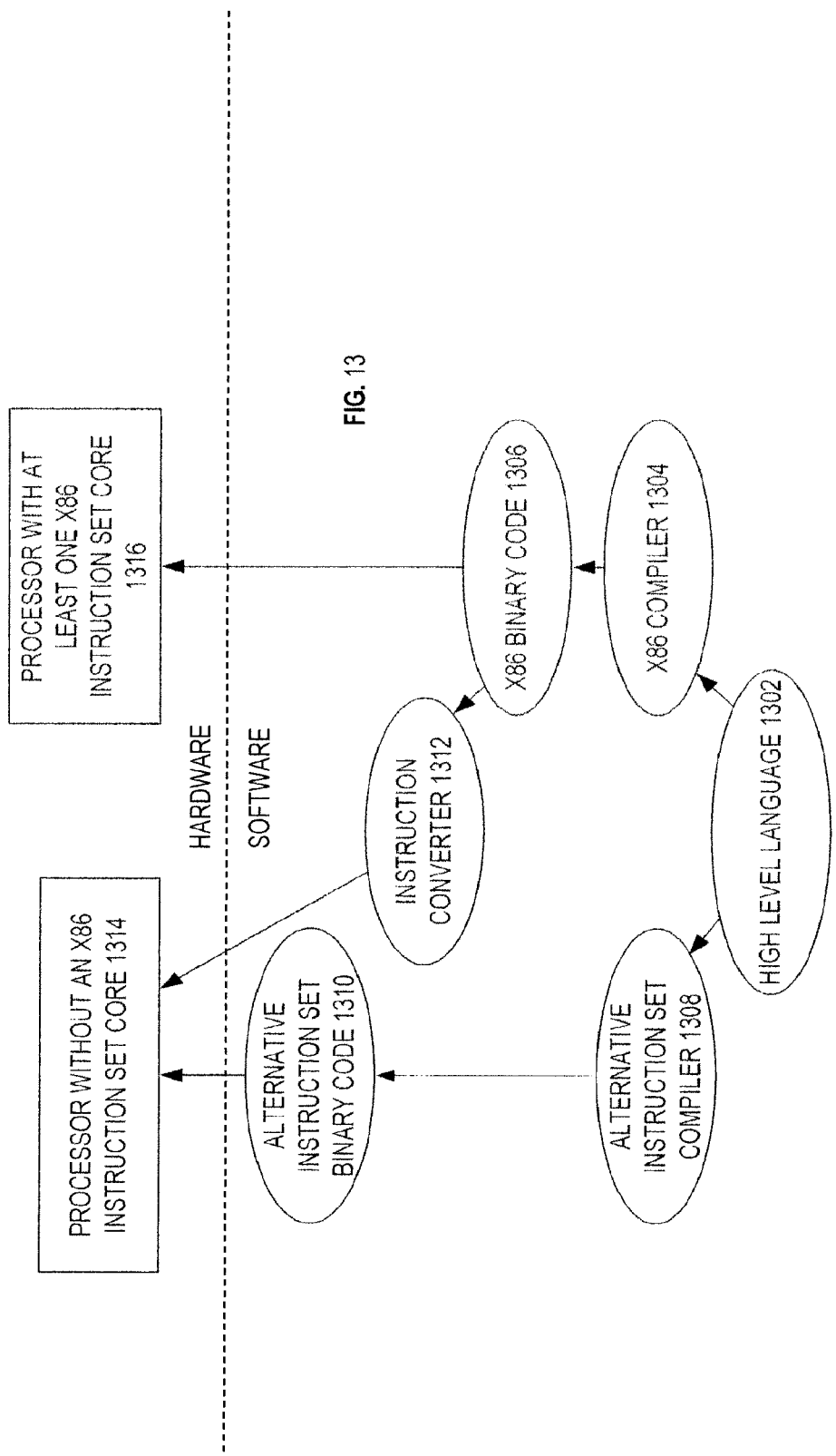

US 9,189,360 B2

PROCESSOR THAT RECORDS TRACING DATA IN NON CONTIGUOUS SYSTEM MEMORY SLICES

BACKGROUND

Software developers often desire to "trace" the execution of their code. Tracing involves keeping a record of the specific sequence of instructions actually executed by software during its runtime. By logging the sequence of instructions, developers can study the instruction sequence to, e.g., identify flaws in the structure and/or flow of the code.

Tracing is typically supported by the underlying processor hardware which contains special logic circuitry to identify instructions as they execute and store them (or respective identifiers of them) in system memory in the order that they execute. For simplicity the remainder of the document may refer to the content of the tracing data as "tracing data", "tracing information", and the like. The reader will understand that tracing data corresponds to actual copies of instructions, portions thereof or some other identifier of the individual instructions or sequence thereof.

BRIEF DESCRIPTION OF THE DRAWINGS

The present invention is illustrated by way of example and not limitation in the figures of the accompanying drawings, in which like references indicate similar elements and in which:

FIG. 6A is a block diagram illustrating both an exemplary in-order pipeline and an exemplary register renaming, out-of-order issue/execution pipeline according to embodiments of the invention;

FIG. 6B is a block diagram illustrating both an exemplary embodiment of an in-order architecture core and an exemplary register renaming, out-of-order issue/execution architecture core to be included in a processor according to embodiments of the invention;

FIG. 13 is a block diagram contrasting the use of a software instruction converter to convert binary instructions in a source instruction set to binary instructions in a target instruction set according to embodiments of the invention.

DETAILED DESCRIPTION

Figure 1:
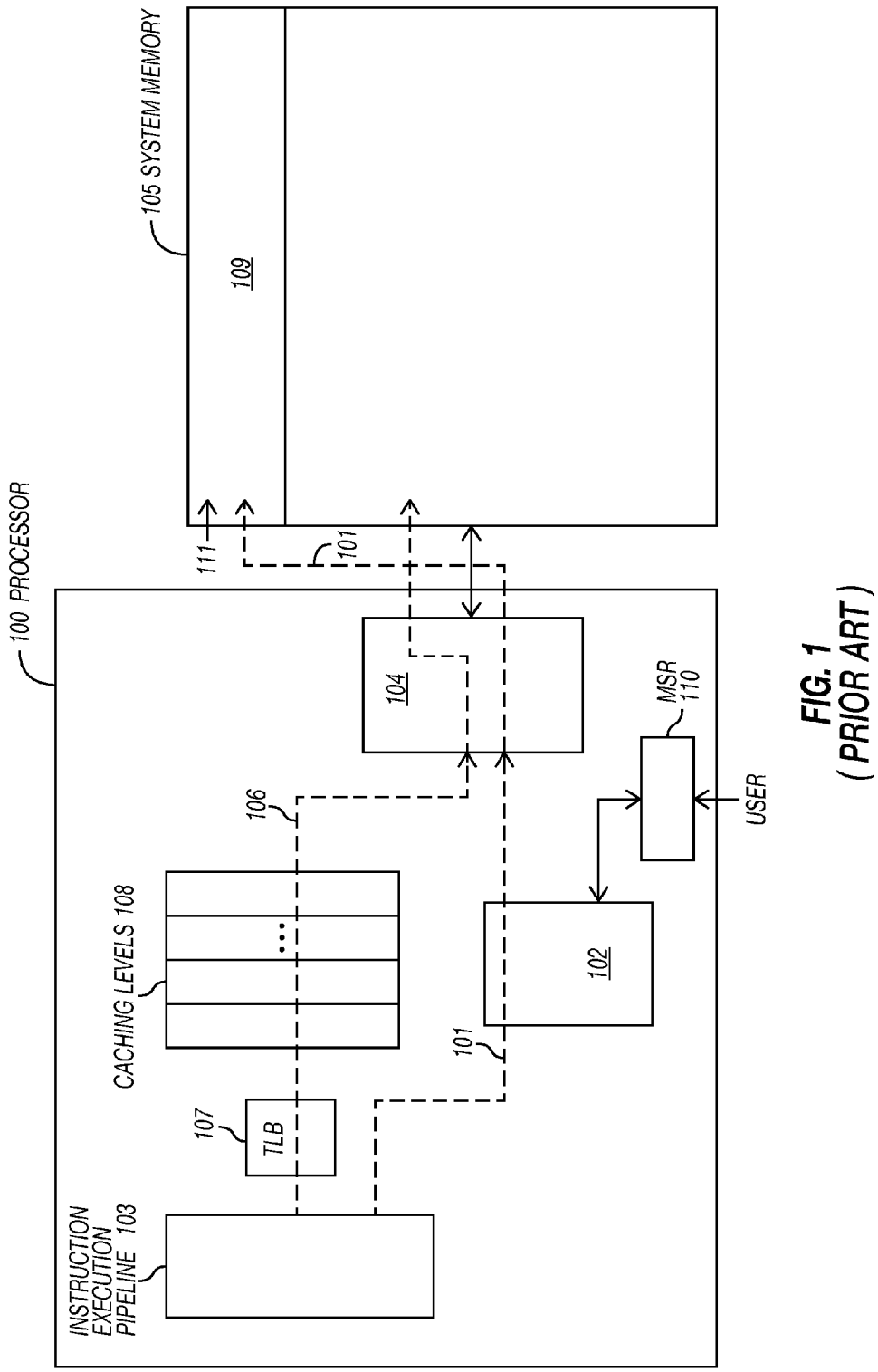
FIG. 1 shows a prior art processor that supports tracing.

FIG. 1 shows an embodiment of a prior art processor 100 having logic circuitry 102 to support tracing. Path 101 corresponds to the data path that is utilized within the processor by the tracing process. As instructions are executed by an instruction execution pipeline 103, a representation of the "flow" of these instructions ("tracing data") is directed toward a system memory interface 104 which stores the flow information in system memory 105.

A noteworthy aspect of the flow of tracing data delivered along path 101 is that no virtual to physical address translation is performed nor is any caching. Here, as is understood in the art, a normal flow of data from an instruction execution pipeline (e.g., data that is created by the executing code) typically involves both. Path 106 represents such a normal flow and includes both a virtual-to-physical address translation stage 107 and one or more caching levels 108.

Virtual-to-physical address translation involves the conversion of the actual addresses called out by an executing software application (which may be written to assume it has the entirety of system memory 105 available to store its instructions and data) to the actual physical system memory address where the instructions and data of the software application are actually stored (which may be within only a slice of system memory space that is given to the application).

Caching is used to speed up software execution. By storing an application's more frequently accessed instructions and data in a caching level 108 rather than system memory 105 the time delay of writing/reading instructions/data to/from system memory 105 is avoided (that is, a caching level is essentially a storage resource having faster access times than system memory).

The avoidance of virtual-to-physical address translation and caching for tracing data helps keep the operation of the software being traced as if no tracing were being performed. Said another way, if tracing data utilized virtual-to-address translation or caching, the storage resources used to implement virtual-to-physical address translation tables or the various caching levels would be used to hold tracing data as opposed to the software application's data. If that were the case, the tracing would "affect" the application's execution (e.g., by having more translation table lookup misses and more cache lookup misses). Because the tracing would affect the application's operation, the tracing data would reflect the operation of an "affected" application and not an application that is operating normally. In this case, the value of the tracing data would be questionable because it would not reflect the execution of the application as it operates normally.

Another feature of the prior art tracing approach of FIG. 1 is the use of a single contiguous block of system memory space 109 to store the tracing data. Here, a user (e.g., one or more of an actual person, an operating system and/or virtual machine monitor) will configure a single block of contiguous address space 109 within system memory 105 where the tracing data is to be stored. The user informs the processor 100 of the existence and location of the large block of contiguous address space 109 by way of a machine specific register 110 that records the starting address 111 of the block 109.

The logic circuitry 102 that oversees the storage of the tracing data essentially prepares a write request containing a packet (e.g., a cache line's worth) of tracing data and an address associated with the block 109 and forwards the write request to the system memory interface 104. The system memory interface 104 then stores the packet of tracing data within the block 109 at the specified address. Logic 102 initially uses the starting address 111 of the block 109 for the initial tracing data and sequentially increases the block addresses as the tracing data continues to flow. In this manner, the instructions represented in the tracing data are stored in the block 109 in the same order that they were executed.

In the prior art approach of FIG. 1, the size of block 109 is limited to a less than desirable maximum size because large contiguous address blocks of system memory space available for use to store tracing data are often non existent on an operational computing system. Here, after nominal configuration of the computer, typically, only smaller slices of system memory address space remain available for the storage of tracing data. Moreover, in an OS environment, large blocks of memory often aren't available. Memory is typically allocated in smaller blocks, and by the time tracing is configured there may be only small fragments of memory available. The techniques described herein allow the user to take advantage of these many small, disparate blocks to form, in effect, a single large buffer.

Figure 2:
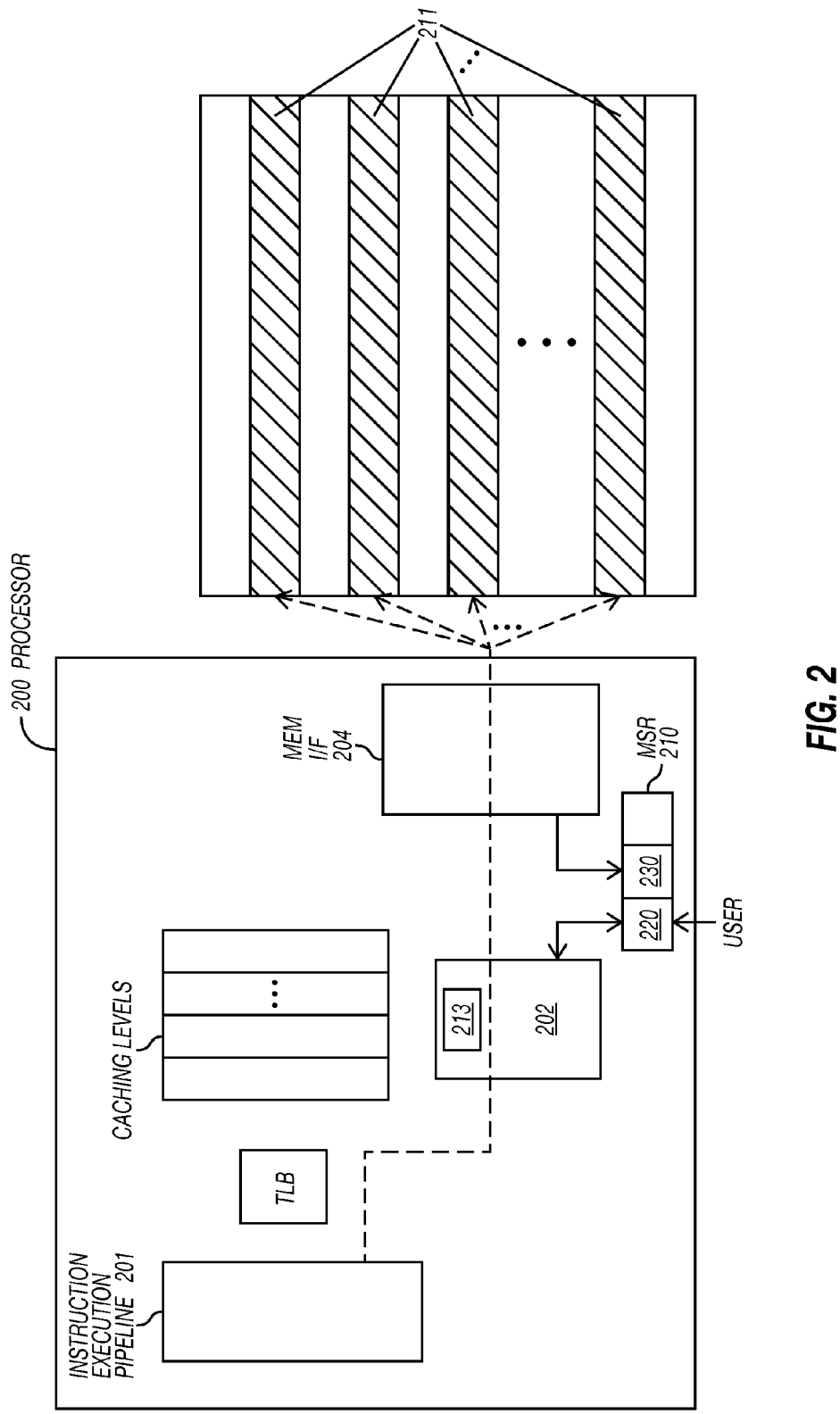
FIG. 2 shows an improved processor that supports tracing.

FIG. 2 shows an improved approach in which the tracing data for a single application may be kept over a number of thinner slices of contiguous address space within system memory 205. By storing the tracing data for a single application within multiple, thinner slices of contiguous address space that are spread out over the (e.g., entire) system memory address range, the total amount of stored tracing data may exceed that of the single block of contiguous address space 109 of the prior art approach of FIG. 1 (i.e., the total amount of utilized memory space utilized by the new approach exceeds that of the single block 109).

Here, as alluded to above, in the operation of any computing system, there are apt to be multiple slices of system memory that are available to store tracing data. The improved approach attempts to store the tracing data in such slices. In an embodiment of the improved approach of FIG. 2, the tracing data does not flow through a TLB stage or any caching levels (but the fetching activity of actually executing code and data does) as discussed above with respect to FIG. 1.

Figure 3:
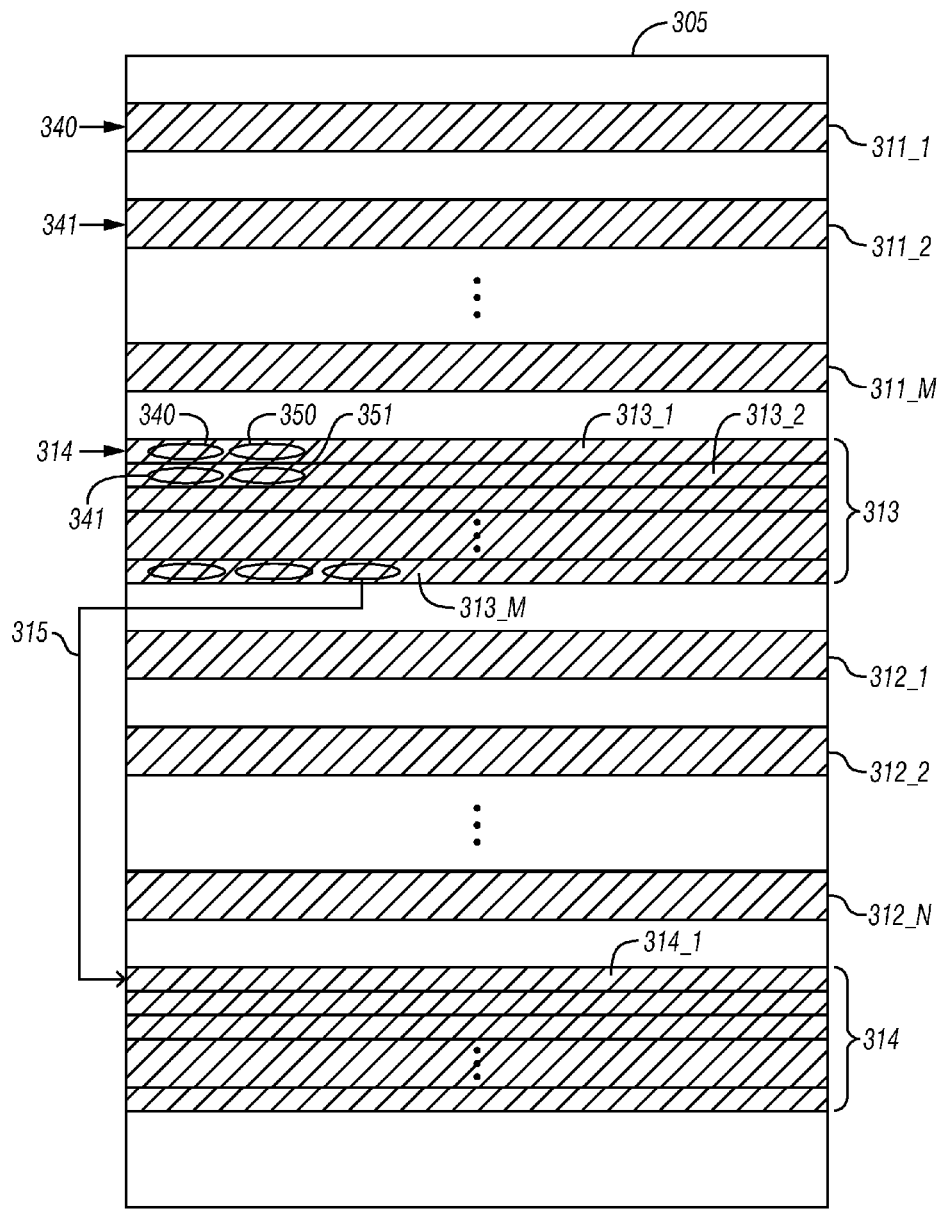
FIG. 3 shows a diagram of memory slices and directory tables within a system memory.

FIG. 3 shows an embodiment of implementing the approach of FIG. 2. As observed in FIG. 3, there are distinct slices 311_1 through 311_M, 312_1 through 312_N of system memory 305 each having its own respective directory table 313, 314 that is also stored in system memory 305. That is, directory table 313 pertains to slices 311_1 through 311_M and directory table 314 pertains to slices 312_1 through 312_N. Each directory contains individual entries for its associated slices. Each entry identifies the size of its corresponding slice and where the slice is located in system memory 305. Moreover, the total collection of slices for a particular application is organized as a linked list. In an embodiment, the "last" entry in the directory table for a particular group of slices also identifies the location of the respective directory table for the "next" group of slices in the linked list that the tracing data is to be stored into.

As an example, assume that tracing data is to be initially stored in slices 311_1 through 311_M in succession and then, upon slice 311_M being "filled", next begin to be successively stored in slices 312_1 through 312_N. In order to accomplish this sequence, upon initialization of the tracing service (which may be effected by setting a bit in machine specific register (MSR) space 210 or other form of control register space, all of which is hereafter referred to as control register space) the logic circuitry 202 within the processor 200 that is responsible for properly storing the tracing data initially issues a read request to the system memory interface 204 for the first directory table 313 in the linked list sequence. In an embodiment, when configuring the tracing service for a particular application, a first field 220 of control register space 210 is written to that identifies the base address 314 of the first directory table 313 in the linked list sequence for the application. Thus, upon initialization of the tracing service, logic circuitry 202 issues a read request to system memory interface 204 containing the base address of the first directory table 313.

In response to the request, the system memory interface 204 performs a read at the base address 314 of the first directory table 313 and returns the first entry 313_1 of the table which identifies the location 340 and size 350 of the first slice 311_1 where tracing data is to be stored. In an embodiment, the location 340 and size 350 information is kept in a second field 230 of control register space 210 and is referred to by logic circuitry 202 as described below.

In an embodiment, location information 340 is the base address of the first slice 311_1 of system memory where tracing data is to be stored. As the tracing data begins to flow from the instruction execution pipeline 201 (noting that in an embodiment one or both of virtual-to-physical address translation and caching is avoided as with the prior are approach discussed just above), logic circuitry 202 constructs write requests having packets containing the tracing data and respective addresses that start with the base address 340 of the first slice 311_1 and increase contiguously as the tracing data continues to flow. Logic circuitry 202 continuously monitors how much tracing data has been sent to the memory interface 304 (in an internal register 213) and compares that amount to the size parameter 350 of the first slice 311_1 (e.g., as kept in field 230 of control register 210).

In an embodiment, at some time before slice 311_1 is filled with tracing data, or at the point which 311_1 is filled with tracing data, logic circuitry 202 issues a read request to the system memory interface 204 for the next entry 313_2 in the first directory table 313 which identifies the location 341 and size 351 of the next slice 311_2. In an embodiment, the address for the next entry in the directory table is easily identified because directory table 313 is stored as contiguous address blocks of address space in system memory 305. In another embodiment, the directory tables are not implemented as contiguous address blocks and each directory table entry contains a pointer to the next entry in the table. As such, in this case, the read information that is returned when a directory table entry is fetched not only includes the location and size of the entry's corresponding slice but also a pointer to the next entry in the table.

The process described above for storing tracing into the first slice 311_1 then continues for the second slice 311_2 and thereafter for the remaining slices up to the last slice 311_M in the first group of slices 311 to which the first directory table 313 pertains. Notably, in an embodiment, the last entry 311_M in the first directory table 313 also contains, besides the location and size of the last slice 311_M, a pointer 315 to the base address of the second directory table 314. Upon the last slice 311_M in the first group of slices 311 becoming filled or imminently close to being filled, logic circuitry 202 will use the pointer 315 to the second directory table 314 to issue a read request to the system memory interface 204 for the first entry 314_1 of the second directory table 314.

Alternatively, rather than keep the pointer 315 to the next directory table in the last entry 311_M for the last slice, a separate last entry (e.g., 311_M+1 not shown in FIG. 3 for convenience) may exist in the directory table 313 that only keeps the pointer 315 to the next table 314. Upon the last slice being or becoming full, logic circuitry 202 will issue a read request for the last entry to the system memory interface 204 to fetch the pointer 315.

The processes described above for the first directory table 313 and first group of slices 311 are then repeated for the second directory table 314 and second group of slices 312 and for all directory tables and respective groups of slices thereafter. Note that in theory there is no limit to the number of slices or directories, so the amount of tracked data that can be kept for a single application may be comparatively larger than the prior art approach of FIG. 1.

It is worthwhile to note that the base address and size of a particular memory slice where tracing data is to be kept may be "packed" in a same directory table entry with other base addresses and respective sizes of other memory slices. For example, base addresses 340, 341 and sizes 350, 351 may be "packed" in single directory table entry (e.g., entry 313_1) along with other base addresses and other sizes of other system memory slices where tracing data is stored. In this case, operation is the same as described above except that a read return of an entry of a directory table returns size and location information for multiple slices rather than a single slice. For instance, a single directory table entry may correspond to a cache line that carries a substantial amount of data (e.g., 64 bytes). As such, base addresses and sizes of many system memory slices may be kept in the single cache line. Here, register space 230 (which holds returned base address and size information) is large enough to hold the entire cache line. Logic circuitry 202 repeatedly refers to this register space in succession to fetch each next base address and size information when a next memory slice is to be utilized (whereas as before a memory access was utilized to obtain this information). When the last location and size information within the cache line is utilized, logic circuitry will access the next entry in table 313 to fetch a next cache line of size and location information.

Figure 4:
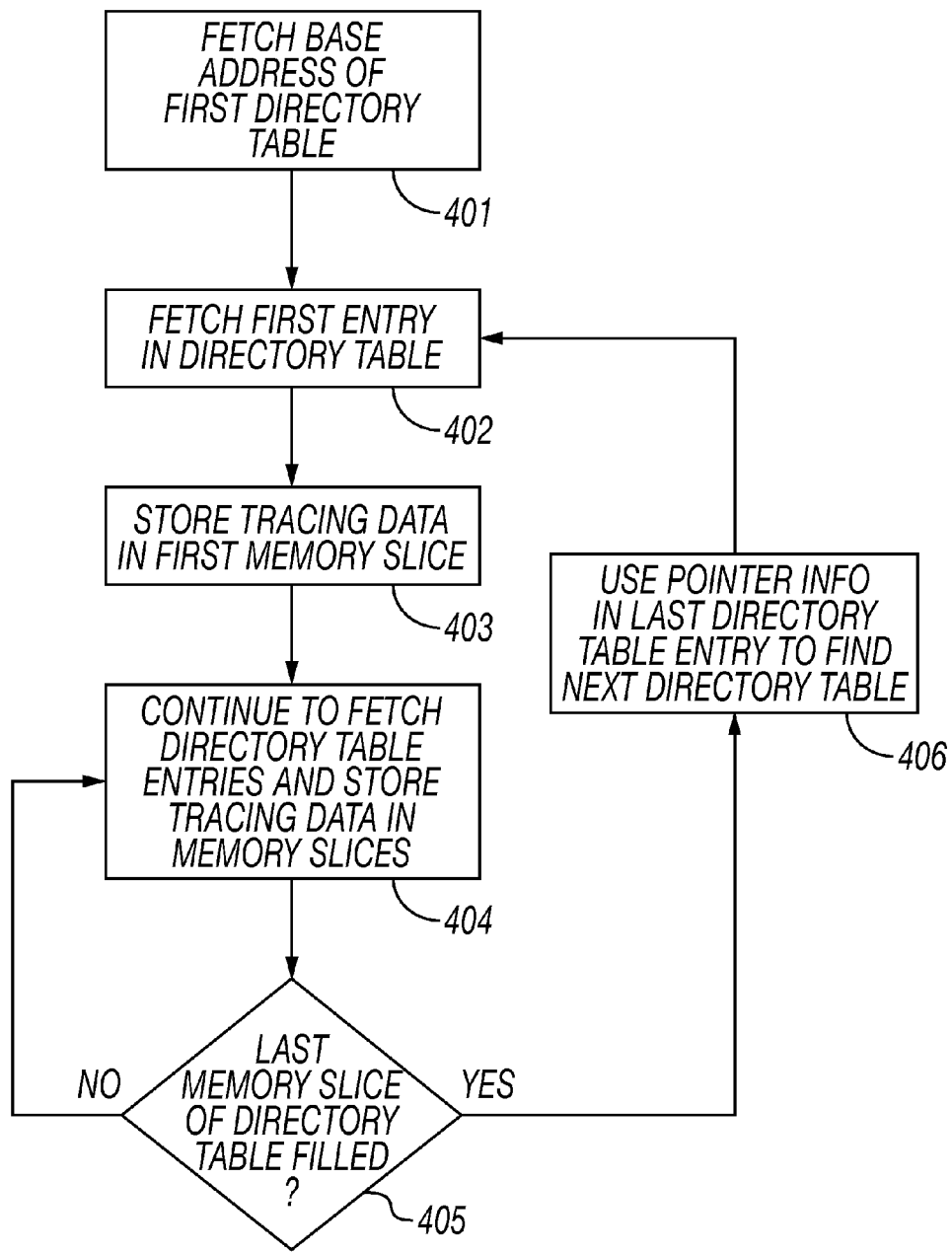
FIG. 4 shows a method performed by the processor of FIG. 2.
Figure 5:
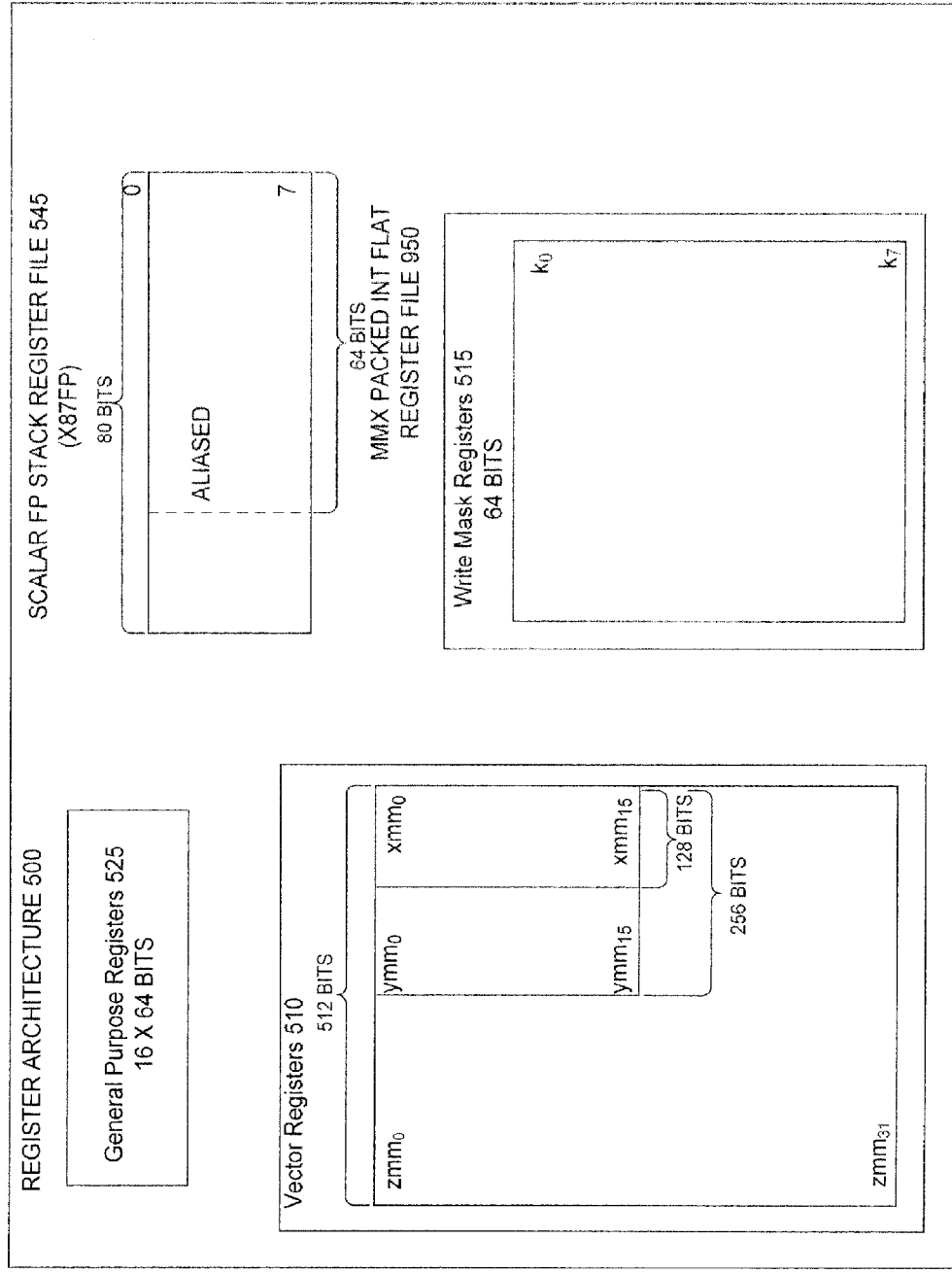
FIG. 5 is a block diagram of a register architecture according to one embodiment of the invention.
Figure 7B:
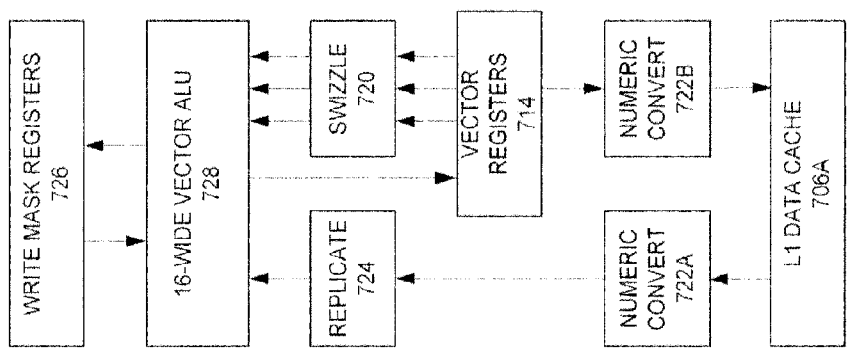
FIGS. 7A-B illustrate a block diagram of a more specific exemplary in-order core architecture, which core would be one of several logic blocks (including other cores of the same type and/or different types) in a chip.
Figure 7A:
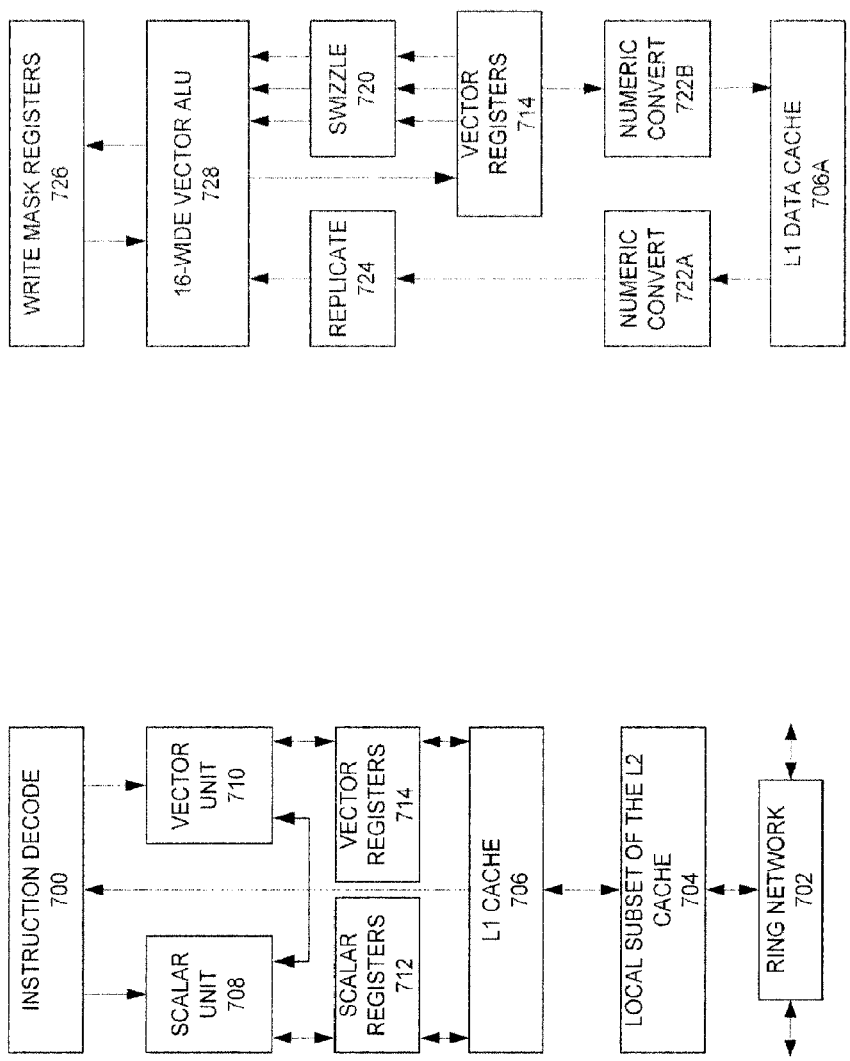
Figure 8:
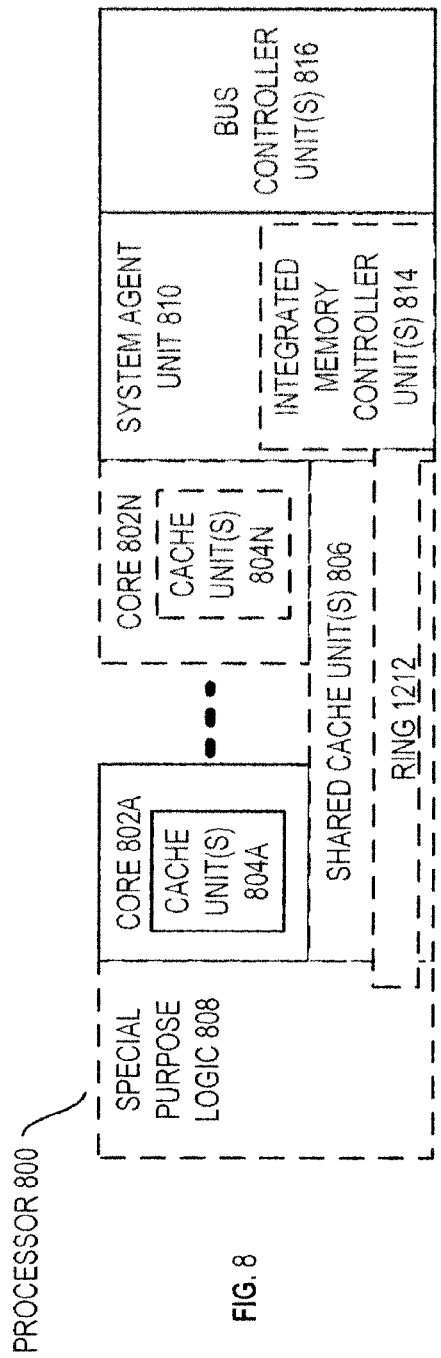
FIG. 8 is a block diagram of a processor that may have more than one core, may have an integrated memory controller, and may have integrated graphics according to embodiments of the invention.
Figure 9:
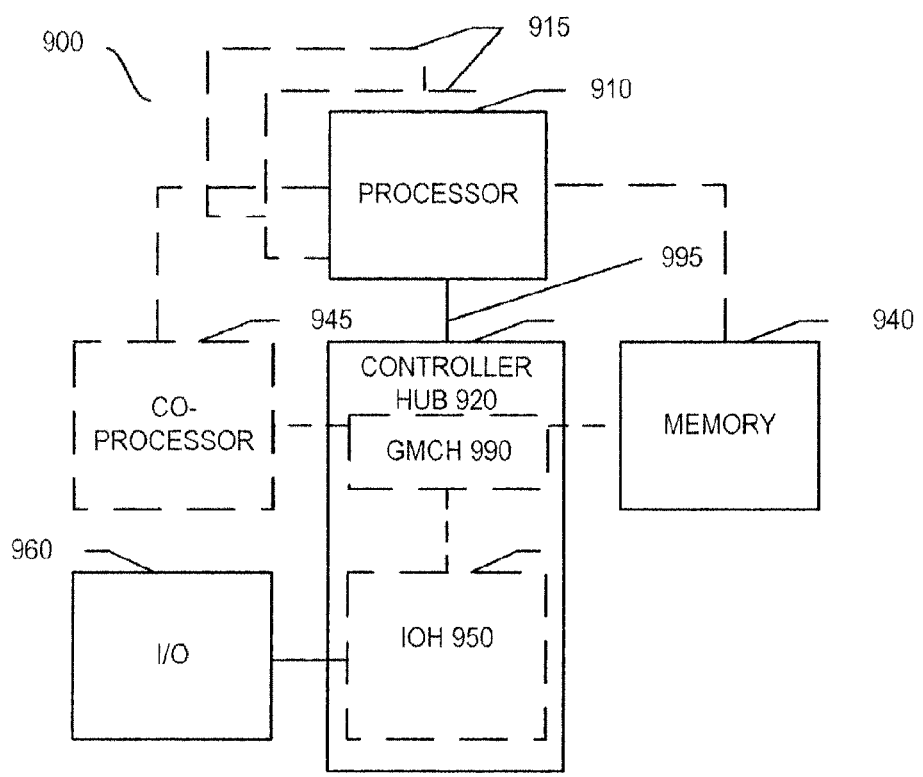
FIG. 9 is a block diagram of a exemplary system in accordance with an embodiment of the present invention.
Figure 10:
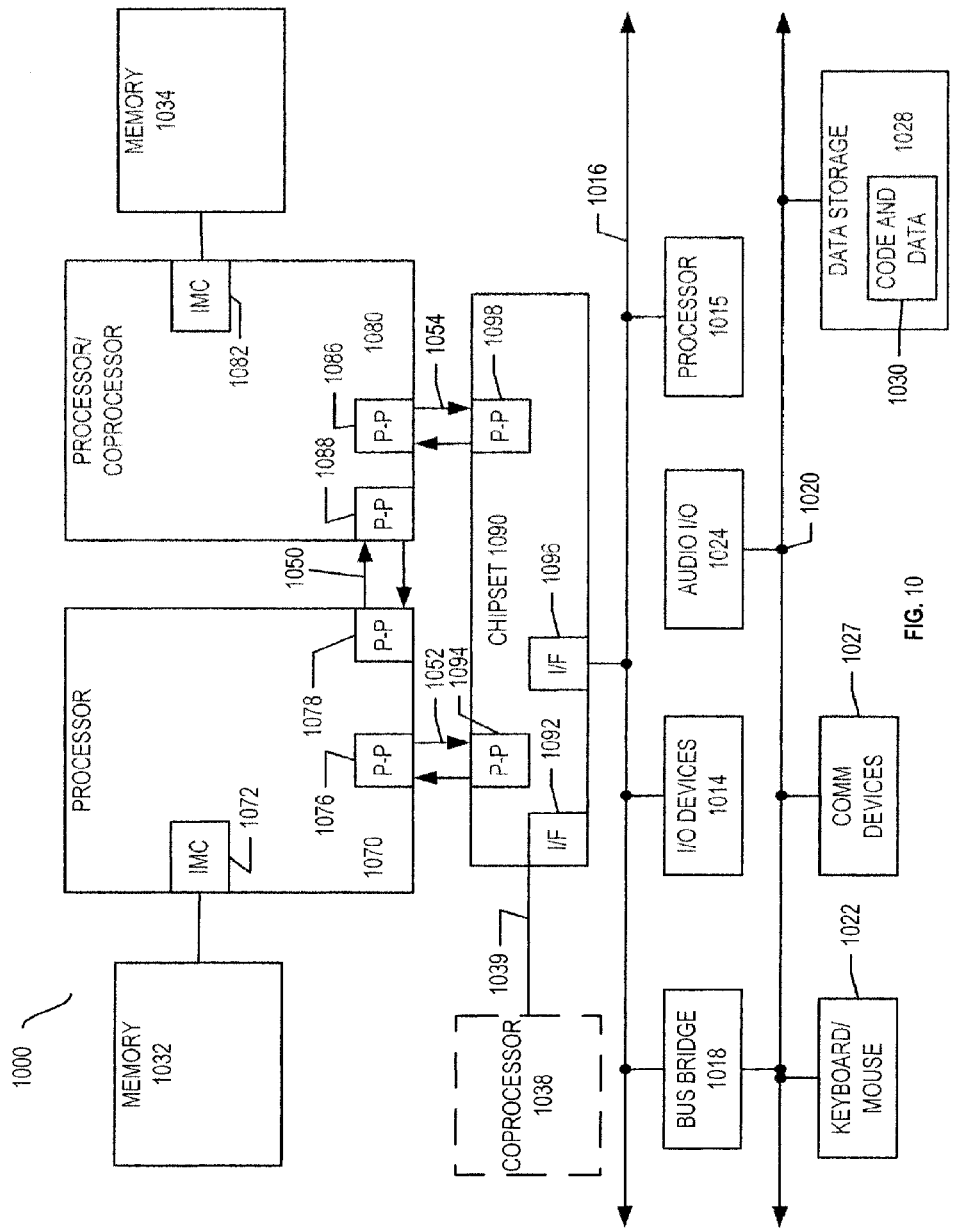
FIG. 10 is a block diagram of a first more specific exemplary system in accordance with an embodiment of the present invention.
Figure 11:
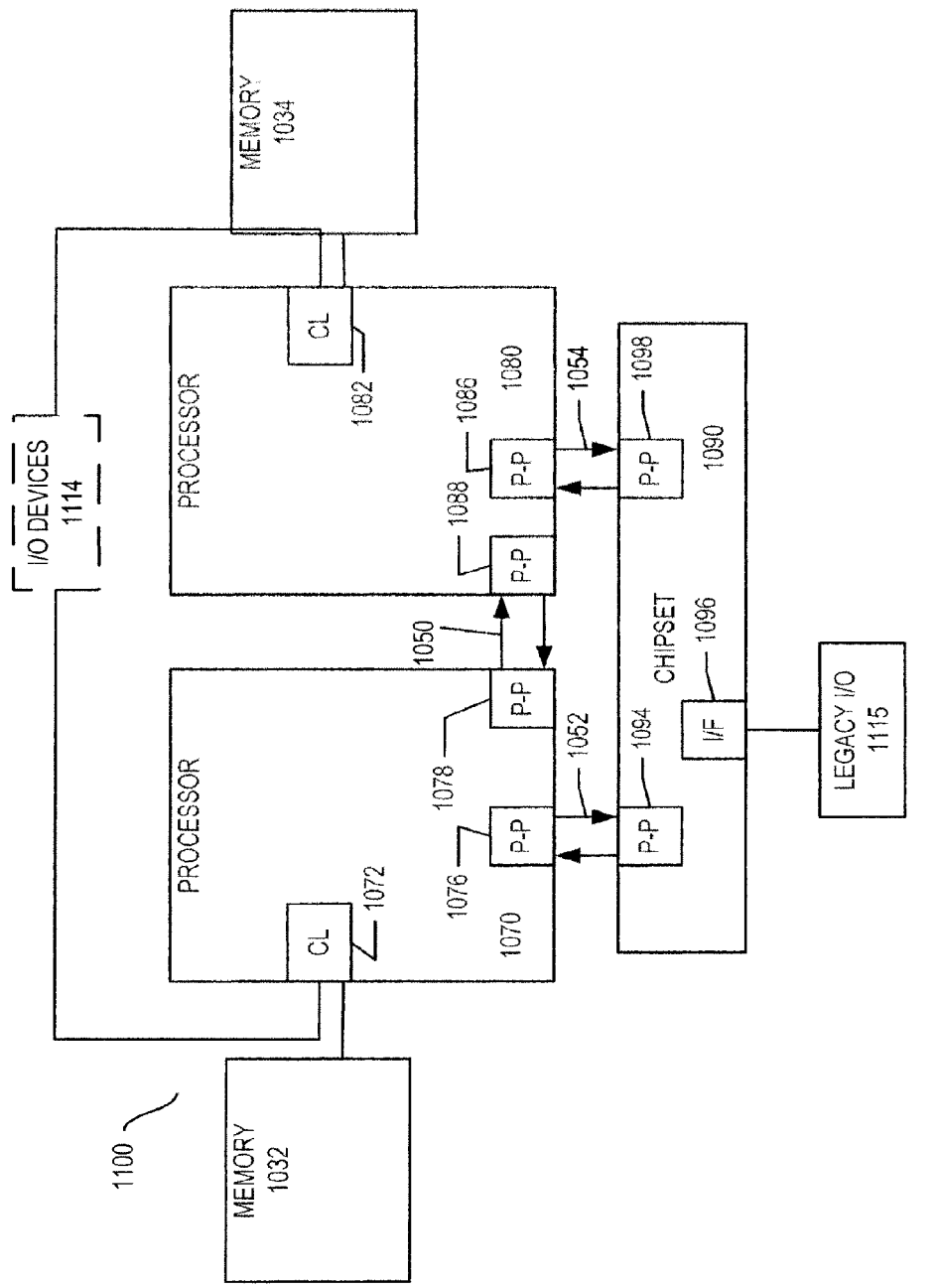
FIG. 11 is a block diagram of a second more specific exemplary system in accordance with an embodiment of the present invention.
Figure 12:
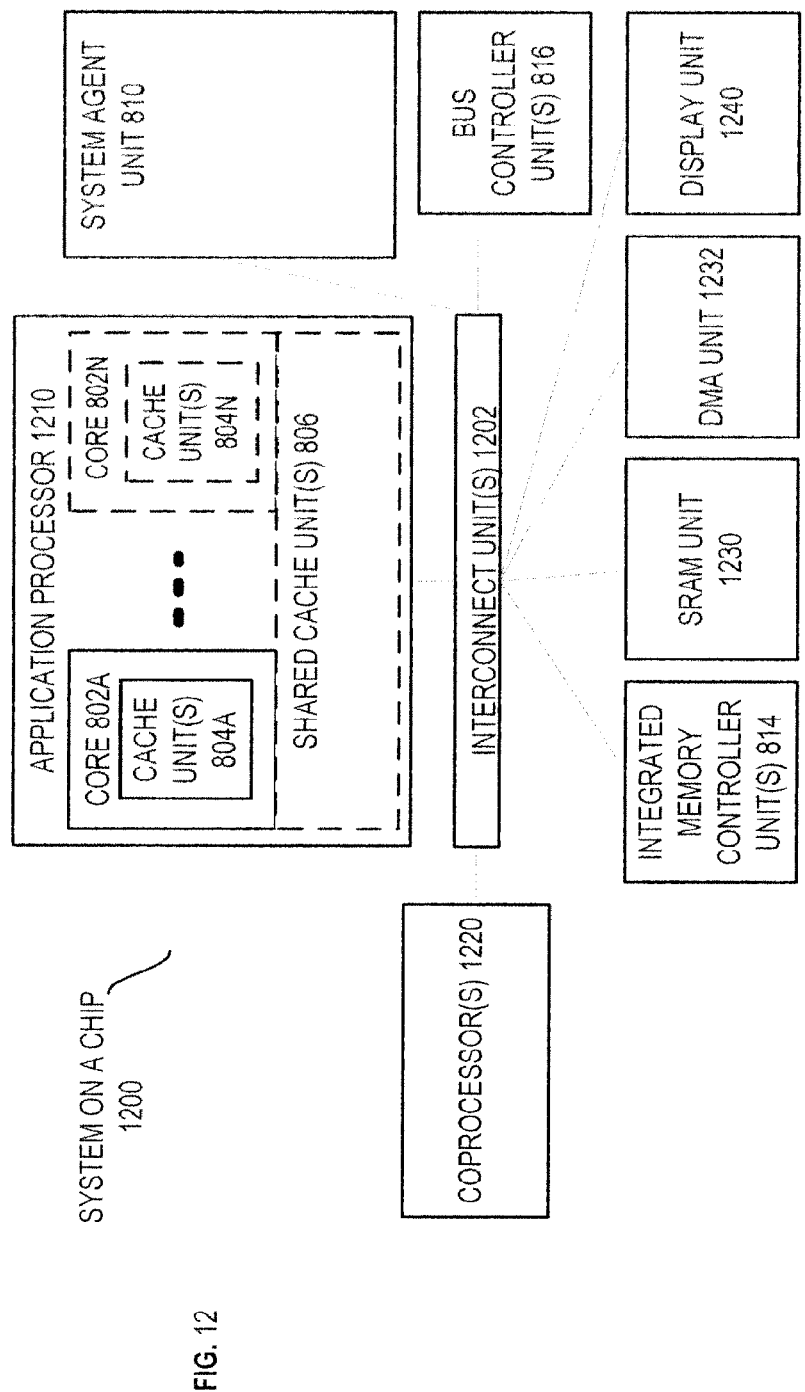
FIG. 12 is a block diagram of a SoC in accordance with an embodiment of the present invention.

FIG. 4 shows an embodiment of a methodology that summarizes processes discussed just above. As observed in FIG. 4, in order to configure tracing for an application, the base address of a first directory table is stored in control register space 401. Upon the start of the tracing service for the application, the base address of the first directory table is used to issue a read request for the first entry of the first directory table 402. The entry identifies the size and location of the first slice in memory where tracking can be stored. Tracing data is then stored in the first slice 403. Upon the first slice being filled or becoming imminently close to being filled 404, the identity of the next slice is fetched from the directory table 402 and process 403 is repeated for the second slice. Processes 402 and 403 are then repeated for subsequent slices until the last slice in the group of slices to which the directory table pertains is reached or begins to be filled 405, at which point, the base address for the next directory table is retrieved 401. The process then repeats for (potentially) multiple additional directory tables and associated groups of slices.

In an embodiment, the user configures the directory tables and stores them in system memory. The user (e.g., the OS, guest OS and/or VMM or an individual through any one or more of these software layers) also "partitions" system memory such that the directory tables and memory storage slices are not used or referred to by any applications or other software of the system. This is accomplished through proper management of the TLB tables (specifically, they are arranged so as not to translate any virtual address into a physical address that corresponds to any directory table space or storage slice space).

A directory table entry may have more fields than size and location information for any particular memory slice. For example, in one embodiment there is also a field of information that signifies whether output generation should be stopped (STOP) when the particular memory slice is filled. This field essentially indicates whether "the end" of the tracing storage has been reached and if so how logic 202 is supposed to behave in response. As such, the STOP bit is set in the entry for the last tracing storage memory slice of all the memory slices. When the last memory slice in the chain is reached and/or filled, logic 202 shuts down tracing activity. A second INT field may also be included along with the STOP field. The INT field is used to indicate whether an interrupt should also be generated when the end of the associated slice is reached. For example, if both the STOP and INT bits are set in an entry, when the associated memory slice is filled, logic 202 will not only stop any further writes of tracing information but will also generate an interrupt. If just the STOP bit is set (i.e., the INT bit is not set), logic 202 will stop write activity but will not generate an interrupt when the associated memory slice is filled.

In some embodiments, a STOP bit may never be set in any of the directories. Instead the pointer in the "last" directory points back to the base address of the "first" directory. This will have the effect of writing tracing data circularly such that older tracing data of a previous cycle in continuously overwritten by newer tracing data from the current cycle.

In additional or alternative embodiments, the same field location within an entry is used to store the base address for a memory slice if the entry pertains to a memory slice, or, the base address/pointer to the next table if the entry does not pertain to a memory slice but rather is at the end of the directory table and therefore contains the pointer to the next table. In this case, an additional field END is included to indicate which situation exists for the particular entry. If the END bit is set, this is the last entry in the directory table and therefore the field contains a pointer to the next table. If the END bit is not set, the field contains the base address of the memory slice where tracing data is to be stored (another field would contain the size of the memory slice). Note that this could still be the last entry despite the END bit not being set, if the STOP bit is set.

In the embodiments discussed above, logic circuitry 202 may be implemented as dedicated logic circuitry or a controller/processing core that executes some form of program code, or some combination of both, in order to perform the actions discussed above. Any such program code may be stored, e.g., in on die storage resource circuitry (e.g., an on die read only memory (ROM)) coupled to logic 202. The program code may be (e.g., permanently or quasi permanently) stored in the storage resource at die manufacture or may be loaded with each bring up of the processor 200. Logic circuitry 202 may include queue circuitry to queue the tracing information prior to a request being created for the memory interface that requests them to be written into a particular memory slice.

Many instruction execution pipelines support context switching. Context switching is the notion that an active hardware thread can be switched out of execution from the pipeline in favor of another thread. For example, if a detection is made that a hardware thread currently executing in the instruction execution pipeline is idling or otherwise not doing much work it may be "switched out of" and another tread "switched into" the instruction execution pipeline. This switching activity typically involves context switching. Context is the state information of a thread (e.g., the thread's user data and control data). When a thread switch is made, context information is also switched in/out of active/inactive hardware thread status.

The tracing information held in the memory slices for a particular thread corresponds to its state/context information. Thus, if a thread is being traced by logic 202 and a decision is made to switch the thread out of active status, in an embodiment, logic 202 oversees an action that switches out the thread's corresponding tracing information within the system memory slices to deeper (e.g., non volatile) storage. Logic 202 also oversees the filling of these same slices with the tracing information (from deeper storage) of the thread that is being switched into active status (if any). In an embodiment, the directory tables are left untouched by a context switch. Alternatively directory table information may also be switched in/out (however they should proscribe overlapping memory slice storage space if so).

Although the above description has pertained largely to the external storage of tracing information, those of ordinary skill will understand that tracing information, in a larger sense, corresponds to "in-situ processor output information". That is, information that is generated while a processor is actually operating (e.g., executing application program code) and provides insight into the processor's inner-workings while it was actually operating. As such the teachings above are applicable generally to in-situ processor output information and not just tracing information specifically.

What is claimed is:

1. A method comprising:
   referring to first information from a directory table in system memory, said first information including location information and size information of a first slice of the system memory where first tracing data is to be stored;
   tracking an amount of tracing data stored in the first slice of the system memory and comparing the amount against the size information; and
   before the first slice of the system memory is filled, referring to second information from said directory table in the system memory, said second information including location information and size information of a second slice of the system memory where second tracing data is to be stored.

2. The method of claim 1 wherein said method further comprises:
   tracking a second amount of tracing data stored in the second slice of system memory and comparing the second amount against the size information of the second slice; and
   upon recognizing that the second slice of the system memory is filled or near filled, referring to third information from said directory table in the system memory, said third information including location information and size information of a third slice of the system memory where third tracing data is to be stored, said first slice not being contiguous with said second slice and said third slice of the system memory.

3. The method of claim 2 further comprising:
   referring to pointer information in the directory table that points to a next directory table in the system memory.

4. The method of claim 3 further comprising:
   using said pointer information to obtain fourth information from said next directory table in the system memory, said fourth information including location information and size information of a fourth slice of the system memory where fourth tracing data is to be stored;
   tracking a third amount of tracing data stored in the fourth slice of the system memory and comparing the third amount against the size information of the fourth slice; and
   upon recognizing that the fourth slice of the system memory is filled or near filled, referring to fifth information from said second directory table in the system memory, said fifth information including location information and size information of a fifth slice of the system memory where fifth tracing data is to be stored, said first slice not being contiguous with said second, third, fourth, and fifth slices of the system memory.

5. The method of claim 1 further comprising receiving a base address of an initial directory table in the system memory.

6. The method of claim 1 further comprising referring to information that indicates what behavior is to be performed when a last memory slice is reached and filled.

7. The method of claim 6 wherein said behavior includes stopping writing of additional tracing information.

8. The method of claim 7 wherein the behavior includes generating an interrupt.

9. A processor comprising:
   logic circuitry to:
   refer to first information from a directory table in system memory, said first information including location information and size information of a first slice of the system memory where first tracing data is to be stored;
   track an amount of tracing data stored in the first slice of the system memory and compare the amount against the size information; and
   before the first slice of the system memory is filled, refer to second information from said directory table in the system memory, said second information including location information and size information of a second slice of the system memory where second tracing data is to be stored.

10. The processor of claim 9 wherein said logic circuitry is further to:
    track a second amount of tracing data stored in the second slice of the system memory and compare the second amount against the size information of the second slice; and
    upon a recognition that the second slice of the system memory is filled or near filled, refer to third information from said directory table in the system memory, said third information including location information and size information of a third slice of the system memory where third tracing data is to be stored, said first slice not being contiguous with said second slice and said third slice of the system memory.

11. The processor of claim 10 wherein said logic circuitry is further to:
    refer to pointer information in said directory table that points to a next directory table in the system memory.

12. The processor of claim 11 wherein said logic circuitry is further to:
    use said pointer information to obtain fourth information from said next directory table in the system memory, said fourth information including location information and size information of a fourth slice of the system memory where fourth tracing data is to be stored;
    track a third amount of tracing data stored in the fourth slice of system memory and compare the third amount against the size information; and
    upon a recognition that the fourth slice of the system memory is filled or near filled, refer to fifth information from said second directory table in the system memory, said fifth information including location information and size information of a fifth slice of the system memory where fifth tracing data is to be stored.

13. The processor of claim 9 further comprising a base address of an initial directory table in the system memory.

14. The processor of claim 9 further comprising information that indicates what behavior is to be performed when a last memory slice is reached.

15. The processor of claim 9 wherein said first slice of the system memory is not contiguous with said second slice of the system memory.

16. A non-transitory machine readable storage medium having stored program code that when processed by a machine causes a method to be performed, the method comprising:
referring to first information from a directory table in system memory, said first information including location information and size information of a first slice of the system memory where first tracing data is to be stored;
tracking an amount of tracing data stored in the first slice of the system memory and comparing the amount against the size information; and
before the first slice of the system memory is filled, referring to second information from said directory table in the system memory, said second information including location information and size information of a second slice of the system memory where second tracing data is to be stored.

17. The non-transitory machine readable storage medium of claim 16, wherein the method further comprises:
tracking a second amount of tracing data stored in the second slice of system memory and comparing the second amount against the size information of the second slice; and
upon recognizing that the second slice of the system memory is filled or near filled, referring to third information from said directory table in the system memory, said third information including location information and size information of a third slice of the system memory where third tracing data is to be stored, said first slice not being contiguous with said second slice and said third slice of the system memory.

18. The non-transitory machine readable storage medium of claim 17, wherein the method further comprises:
referring to pointer information in the directory table that points to a next directory table in the system memory.

19. The non-transitory machine readable storage medium of claim 18, wherein the method further comprises:
using said pointer information to obtain fourth information from said next directory table in the system memory, said fourth information including location information and size information of a fourth slice of the system memory where fourth tracing data is to be stored;
tracking a third amount of tracing data stored in the fourth slice of the system memory and comparing the third amount against the size information of the fourth slice; and
upon recognizing that the fourth slice of the system memory is filled or near filled, referring to fifth information from said second directory table in the system memory, said fifth information including location information and size information of a fifth slice of the system memory where fifth tracing data is to be stored, said first slice not being contiguous with said second, third, fourth, and fifth slices of the system memory.

20. The non-transitory machine readable storage medium of claim 16, wherein the method further comprises receiving a base address of an initial directory table in the system memory.

* * * * *